(12) United States Patent
Zhang et al.

(10) Patent No.: US 6,914,938 B2
(45) Date of Patent: Jul. 5, 2005

(54) INTERLACED VIDEO MOTION ESTIMATION

(75) Inventors: Jian Zhang, Enfield (AU); Reji Mathew, Riverwood (AU); Xing Zhang, Menai (AU)

(73) Assignee: Motorola, Inc., Schaumburg, IL (US)

( * ) Notice: Subject to any disclaimer, the term of this patent is extended or adjusted under 35 U.S.C. 154(b) by 574 days.

(21) Appl. No.: 10/173,896

(22) Filed: Jun. 18, 2002

(65) Prior Publication Data

US 2003/0231711 A1 Dec. 18, 2003

(51) Int. Cl.$^7$ ................................................. H04N 7/12
(52) U.S. Cl. ............. 375/240.16; 375/240; 375/240.01; 375/240.12
(58) Field of Search ....................... 375/240.16, 240.12, 375/240, 240.01, 240.02

(56) References Cited

U.S. PATENT DOCUMENTS

| | | | |
|---|---|---|---|
| 5,737,023 A | 4/1998 | Linzer | |
| 6,078,615 A | * 6/2000 | Yamamoto et al. | ......... 375/240 |
| 6,147,718 A | 11/2000 | Takashima et al. | |
| 6,560,286 B1 | * 5/2003 | Tian et al. | ............. 375/240.16 |

* cited by examiner

Primary Examiner—Allen Wong

(57) ABSTRACT

A method for determining motion vectors in an interlaced video coding system for coding images comprising interlaced odd and even field. The method (30) includes selecting (32) a current odd field block and a current even field block that respectively comprise odd and even fields of a selected current image block. Differences are identified (33) and thereafter, suitable best matching odd and even field matching reference blocks are determined (34). From the suitable best matching odd and even field matching reference blocks a reduced field search area is provided (35) that is used to complete further searching (36) and selection of field motion vectors (38). Pseudo-frame motion vector selection is also conducted (43) and a preferred motion vector is selected (44) from either a field motion vector pair or pseudo-frame motion vector.

7 Claims, 2 Drawing Sheets

—PRIOR ART—

—PRIOR ART—

—PRIOR ART—

—PRIOR ART—

—PRIOR ART—

—PRIOR ART—

INTERLACED VIDEO MOTION ESTIMATION

FIELD OF THE INVENTION

This invention relates to a method of estimating motion in interlaced video, and especially to a method of estimating motion in interlaced video to enable efficient coding of the interlaced video.

BACKGROUND OF THE INVENTION

In a typical video coding system, the video input is in the form of consecutive image frames, with each frame comprising a number of pixels. Although each frame could be individually coded and transmitted to a receiver where it can be decoded and displayed, a key point for improving video coding efficiency is to achieve bit rate saving while maintaining a given image quality. To achieve this, there are several different techniques within current video coding technologies that try to reduce the number of bits that need to be coded and transmitted. These are:

(i) motion estimation (ME) and motion compensation (MC) mode selection;
(ii) field/frame based Discrete Cosine Transformation (DCT) mode selection;
(iii) quantisation driven by rate control algorithm; and
(iv) entropy coding.

Motion estimation and motion compensation seek to remove the temporal-domain redundancy present in natural video sources. Therefore motion estimation is important to a video coding system. However motion estimation is also the most computational complex element in a video coding system, especially for real-time full-motion video communication which requires a real-time implementation of a video encoder with a large motion search window. The search window of motion displacements can be as large as ±128 pixels in the MPEG-2 Main Profile and Main Level standard, as described in ISO/IEC Standard 13818-2, Generic coding of moving pictures and associated audio information: Video 1995, and can be much larger in high-resolution and high-quality entertainment video applications.

It will therefore be appreciated that a commercial implementation of real-time block matching motion estimation (ME) involves considering memory bandwidth (the required amount of data fetching from frame buffer to the ME processor), a search pattern to be used (the motion searching complexity within a given search window or fast search algorithm), a matching metric to be used (the basic matching complexity for each matching operation or block matching metrics), and the suitability of the process for real-time hardware implementations (the ability of the process to be efficiently pipelined).

Motion estimation involves matching of a block in a current frame with a block in a reference or previous frame. A full-search block matching technique using original pixel values examines all possible motion displacements, known as motion vectors (MV), within the search window to find the best match in terms of a predetermined distortion criterion. Due to the heavy computation and extensive data fetching required between the frame buffer and the processor performing the motion estimation, a full-search motion estimation using pixel intensities is only used for motion search in relatively small search ranges. Thus, many fast searching schemes have been developed to reduce computation and data fetching. Some of these are described by J. Feng, K. T Lo and H. Mehrpour, in "MPEG Compatible Adaptive Block Matching Algorithm for Motion Estimation", published in Australian Telecommunication Networks and Applications Conference, December 1994; by J. N Kim and T. S Choi, in "A Fast Motion Estimation for Software Based Real-Time Video Coding", published in IEEE Transactions on Consumer Electronics, Vol 45, No 2, pp 417–425, May 1999; by B. Liu and A. Zaccarin, in "A Fast Algorithm for the Estimation of Block Motion Vectors", published in IEEE Transactions of Circuits and Systems for Video Technology, Vol 3, pp 730–741, April 1993; and by J. Chalidabhongse and C. C. Jay Kuo, in "Fast Motion Estimation Using Multiresolution-Spatio-Temporal Correlations", published in IEEE Transactions of Circuits and Systems for Video Technology, Vol 7, No. 3, pp 477–488, June 1997.

To complicate matters, in interlaced video, alternate lines of each frame are generated at different times. For example the odd lines, forming one field, and the even lines, forming another field, are generated separately, even though the odd and even lines are interlaced with each other. Because of the time difference between generation of the two fields, looking for positional changes in a block between one frame and another causes complications. To deal with interlaced video data format, both MPEG-2 and MPEG-4 standards have functionalities to code full CCIR Rec. 601 resolution (i.e. 720×480 @60 HZ interlaced field rate). As defined in the MPEG 2 standard, video format follows the Rec. 601 interlaced form. Therefore, further consideration must be given to deal with interlaced format video. A simple approach would be to merge each pair of fields to form a frame. However, as the two fields are generated at different times (1/50th of a second apart for Rec. 601 @25 Hz), moving objects are in different places in each field and so do not merge well. Another approach would be to code the even and odd fields separately.

The decision to code in frame mode or in field mode can be made at the macro block level. A macro block, which has dimensions of 16×16 pixels, is composed of even field lines and odd field lines arranged in an interlaced format. To find the best mode of coding, results of motion estimation in the frame mode is compared with results of motion estimation in the field mode. The decision to code either in frame or field mode depends on both error residue and motion vectors (MV) produced by motion estimation. Unfortunately, such an approach can be computationally expensive.

In U.S. Pat. No. 5,737,023 there is described a system and method for performing motion estimation on interlaced frames by refinement. However, the system and method does not provide reduced search areas for field motion estimation after determining a possible suitable block match associated with a potential motion vector.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for determining motion vectors in an interlaced video coding system for coding images comprising interlaced odd and even fields, the method comprising the steps of:

(i) selecting a current odd field block and a current even field block that respectively comprise odd and even fields of a selected current image block of a current image;

(ii) identifying differences between the current odd field block and reference blocks in a first search window that is one of either an even field search window of even fields or an odd field search window of odd fields that combined form part of a reference image, and the differences between the current even field block and the reference blocks in a second search window that is the other one of the even field search window or odd field search window;

(iii) determining, from the differences in the step of (ii) identifying, a suitable first odd field matching reference block for the current odd field block and a suitable first even field matching reference block for the current even field block;

(iv) providing, from the suitable first odd field matching reference block and suitable first even field matching reference block, respective reduced search areas in the even field search window and odd field search window;

(v) searching the reduced search areas for identifying the differences between the current odd field block and the reference blocks in the second search window and identifying the differences between the current even field block and the reference blocks in the first search window;

(vi) determining, from the differences in the step of (v) searching, a suitable second odd field matching reference block for the current odd field block and a suitable second even field matching reference block for the current even field block; and (vii) selecting a respective field motion vector for both the current odd field block and current even field block, the respective motion vector being based on relative motion between the current odd field block and either the first or second odd field matching reference block and relative motion between the current even field block and either the first or second even field matching reference block.

The method may also preferably include the steps of:

(viii) determining a suitable pseudo-frame matching reference block from combined differences that are the differences, identified in step (ii), of each odd field block and even field block that comprise the current image block when compared with respective blocks having corresponding search window locations; and (ix) providing, from the pseudo-frame matching reference block, reduced pseudo-frame search areas in the even field search window and odd field search window.

Suitably, after the step (ix) of providing, the method may also preferably include the further steps of:

(x) searching the reduced pseudo-frame search areas for identifying the pseudo-frame differences between the current odd field block and the reference blocks in both the first and second search window and identifying the differences between the current even field block and the reference blocks in the first and second search window; and (xi) determining, from the pseudo-frame differences in the step of (x) searching, a suitable first pseudo-frame matching reference block from one reference block pair comprising a reference block in the even field search window for the current even field block and corresponding reference block in the odd field search window for the current odd field block, and a suitable second pseudo-frame matching reference block from another reference block pair comprising a reference block in the odd field search window for the current even field block, and a corresponding reference block in the even field search window for the current odd field block, where each said reference block pair has corresponding search window locations; and (xii) selecting a pseudo-frame motion vector from either the first or second pseudo-frame matching reference block.

The method may also include a further step of (xiii) picking a preferred motion vector from either the pseudo-frame motion vector or the respective field motion vector for both the current odd field block and current even field block.

Suitably, the step of (xiii) picking includes comparing the differences associated with the pseudo-frame motion vector with differences associated with the respective field motion vector for both the current odd field block and current even field block.

Preferably, if the differences, in the step of (xiii) picking, associated with the pseudo-frame motion vector have a count value of no more than 100 counts greater than the count value for the combined differences associated with the respective field motion vector for both the current odd field block and current even field block, then the preferred motion vector is the pseudo-frame motion vector.

Preferably, the step of (iii) determining and the step of (viii) are effected concurrently.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE DRAWINGS

Figure 1A:
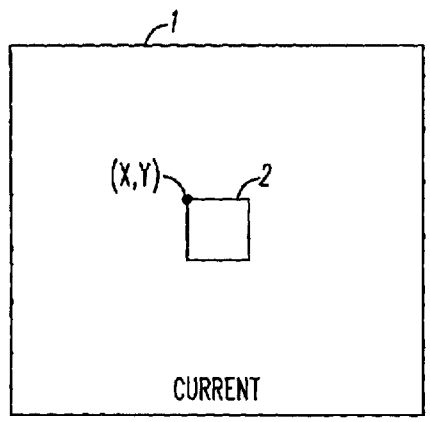
FIGS. 1a and 1b are schematic diagrams illustrating how prior art block-based motion vectors are determined for motion estimation.

In the drawings, like numerals on different Figures are used to indicate like elements throughout.

As mentioned above, in order to reduce the amount of coding required for video transmission, it is desirable to remove the temporal-domain redundancy present in natural video sources. Therefore, it is usual to determine an image block in a previous frame (reference frame) that is the most similar to a particular image block within a current frame. If the blocks are very similar, the image block in the current frame requires reduced, or even no, coding in addition to the motion vector (the amount the block has moved between the current and reference frame) coded and transmitted. In order to determine the closest (most similar) image block in a reference frame, a search is carried out in a search window, rather than over the whole of the reference frame, although that can, of course, be done, although it is computationally intensive.

Figure 1B:
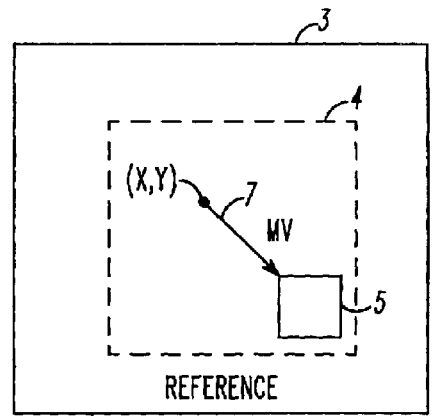

The search window is an area of pixels, in the reference frame, within which the system searches for a closest match to a particular block of pixels in the current frame so as to try to determine whether and how far the image block has moved from one frame to the next. This is shown schematically in FIG. 1a and FIG. 1b where a motion vector 7 is determined by searching a search window 4, in a reference frame 3, to try to find a matching image block 5 for an image block 2 in a current frame 1. The matching image block 5 is offset from a reference location (x,y) of image block 2 by an amount indicated by the Motion Vector 7. A block matching metric, such as Sum of Absolute Differences (SAD) can be used to determine the level of similarity between the current block and a block in the previous (or reference) image. SAD is described by Viet L. Do and Kenneth Y. Yun, in "A Low-power VLSI Architecture for Full-Search Block-Matching Motion Estimation", IEEE Transactions on Circuits and Systems for Video technology, Vol. 8, No. 4, August 1998, and is incorporated into this specification by reference. The location in the reference frame 3 which produces the lowest SAD is taken to be the position of best match.

Figure 2A:
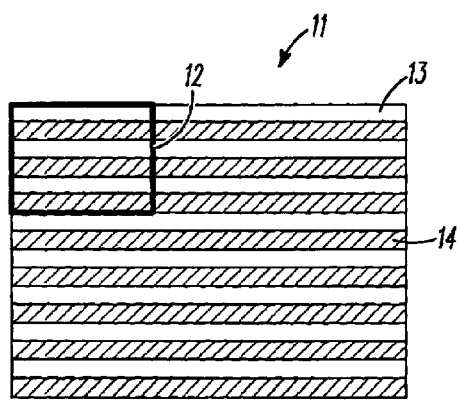
FIGS. 2a and 2b are schematic diagrams illustrating a prior art search space for block based frame motion vector determining for interlaced video motion estimation.
Figure 2B:
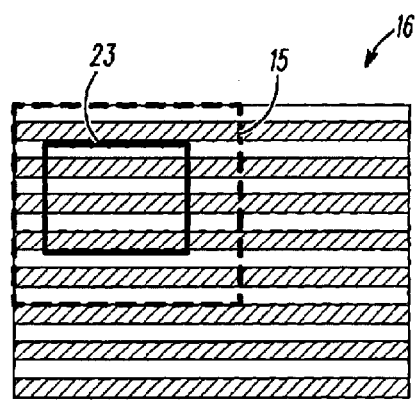

For interlaced video, motion estimation is typically conducted in both frame mode and field mode. To locate the best possible match in a given search range, frame motion estimation and field motion estimation are usually conducted independently. Frame motion estimation for interlaced video is illustrated in FIGS. 2a and 2b, where an image block 12 in a current image frame 11 has two interlaced fields, which are designated as odd field 13 and even field 14. The frame based search is performed first in a search window 15 in a reference image frame 16 with the location of a matching image block 23 that is determined by the lowest frame based SAD match. Equation 1 shows the frame SAD calculation for the image block 12 (i.e. a block of 16×16 pixels):

$$\text{SAD\_Frm}(dx, dy) = \sum_{x=0}^{15} \sum_{y=0}^{15} |p(x, y, t) - p(x + dx, y + dy, t - 1)| \quad (1)$$

where:

SAD_Frm: Frame SAD p(x,y,t): pixel in the current image at time t.

p(x,y,t−1): pixel in the previous image (image at time t−1)

dx: displacement in the x-direction (x component of motion vector)

dy: displacement in the y-direction (y component of motion vector).

Field motion estimation is then performed to find the best field matching image blocks.

Figure 3A:
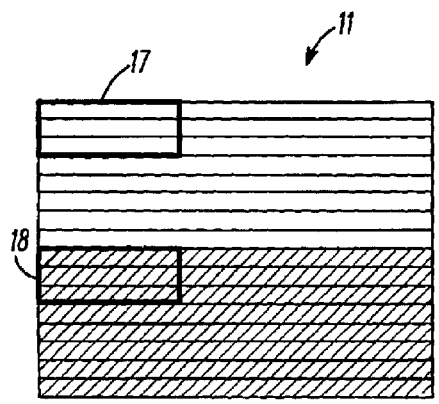
FIGS. 3a and 3b are schematic diagram illustrating a prior art search space for block based field motion vector determining for interlaced video motion estimation.
Figure 3B:
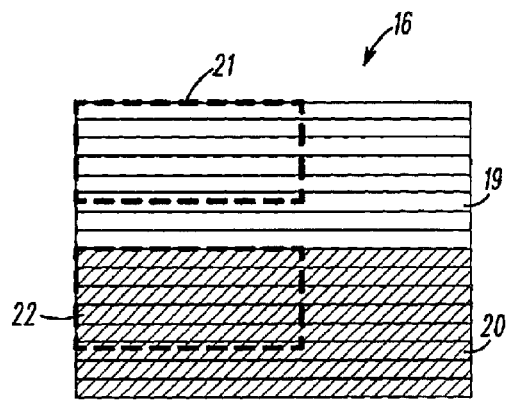

Field motion estimation for interlaced video is illustrated in FIGS. 3a and 3b, where the image block 12 of the current image frame 11 is divided into two blocks, these being a current odd field block 17 and current even field block 18, each comprising 16×8 pixels, one block 18 containing only even fields and the other block 17 containing only odd fields. The search window 15 is also divided an odd search window 21 and an even search window 22. As will be apparent to a person skilled in the art, the field based search for block 17 is conducted in both even and odd search windows 21,22 using SAD and similarly the field based search for block 18 is conducted in both even and odd search windows 21,22 using SAD. The SAD calculation for field mode is shown below in Equation 2:

$$\text{SAD\_Fld}_{kl}(dx, dy) = \sum_{x=0}^{15} \sum_{y=0}^{8} |p_k(x, y, t) - p_l(x + dx, y + dy, t - 1)| \quad (2)$$

where:

SAD_Fld: Field SAD $p_k(x,y,t)$: pixel in the current field (either even (k=0) or odd field (k=1)).

$p_l(x,y,t-1)$: pixel in the previous field (either even (l=0) or odd field (l=1))

dx: displacement in the x-direction (x component of motion vector)

dy: displacement in the y-direction (y component of motion vector)

Thus, there are four patterns to drive the field predication, as listed below:

Even field to even field (k=0, l=0)
Even field to odd field (k=0, l=1)
Odd field to even field (k=1, l=0)
Odd field to odd field (k=1, l=1)

In the prior art, after both frame based and field based motion estimation is complete, a decision is made on the mode of coding. This involves comparing the frame based motion estimation results with the best pair of field motion estimation results.

Figure 4:
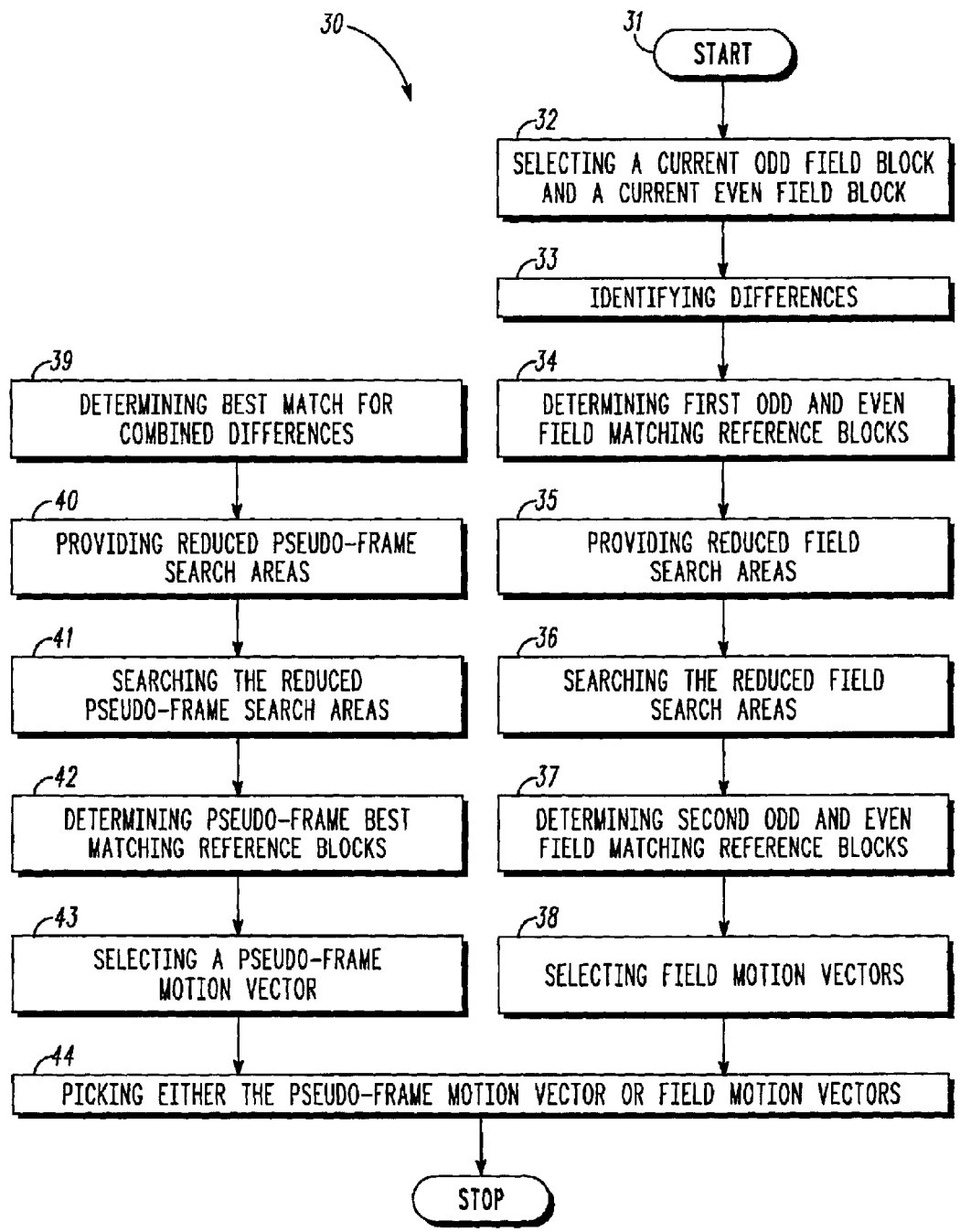
FIG. 4 illustrates a method for determining motion vectors in an interlaced video coding system for coding images comprising interlaced odd and even fields.

In order to reduce the level of computation required to calculate both frame based and field based motion estimation, a preferred embodiment of the present invention is now described. In FIG. 4 there is illustrated a method 30 for determining motion vectors in an interlaced video coding system for coding images comprising interlaced odd and even fields. As will be apparent to a person skilled in the art, the following terminology, where applicable, has the same meaning as the above terminology that refers to FIGS. 1a to 3b.

After a start step 31 the method 30 effects a selecting step 32 for selecting a current odd field block and a current even field block that respectively comprise odd and even fields of a selected current image block of a current image frame. An identifying step 33 then provides for identifying differences between the current odd field block and reference blocks in a first search window that is one of either an even field search window of even fields or an odd field search window of odd fields that combined form part of a reference image, and the differences between the current even field block and the reference blocks in a second search window that is the other one of the even field search window or odd field search window. For example, if the first search window is an odd field search window then the second search window will be an even field search window. Accordingly, the differences will be for odd field to odd field and even field to even field. Alternatively, if the first search window is an even field search window then the second search window will be an odd field search window. Accordingly, the differences will be for odd field to even field and even field to odd field. In this embodiment the differences are identified by SAD using a sub-sampled block matching as will be apparent to a person skilled in the art.

A determining step 34 is effected for determining, from the differences in the identifying step 33, a suitable first odd field matching reference block for the current odd field block and a suitable first even field matching reference block for the current even field block. A providing reduced field search areas step 35 is then performed thereby providing, from the suitable first odd field matching reference block and suitable first even field matching reference block, respective reduced search areas in the even field search window and odd field search window. Typically, the reduced field search areas enclose their respective suitable first odd field matching reference block and suitable first even field matching reference block with a two pixel wide boundary.

A searching the reduced field search areas step 36 then searches the reduced search areas for identifying the differences between the current odd field block and the reference blocks in the second search window and identifying the differences between the current even field block and the reference blocks in the first search window.

A determining second odd and even field matching reference blocks step 37 then determines, from the differences in step 36, a suitable second odd field matching reference block for the current odd field block and a suitable second even field matching reference block for the current even field block. Then, a selecting field motion vectors step 38, provides for a respective motion vector for both the current odd field block and current even field block, the respective motion vector being based on relative motion between the current odd field block and either the first or second odd field matching reference block and relative motion between the current even field block and either the first or second even field matching reference block.

Further to the above, directly after the identifying step 33 the method also effects the following steps starting with a determining best match step 39 for combined differences which is effected concurrently with step 34. The combined differences being the corresponding differences (identified in step 33) of each corresponding odd field block and even field block that comprise a current image block. Hence, the determining best match step 39 determines a suitable pseudo-frame matching reference block for the corresponding current image block when compared with respective blocks having corresponding search window locations.

After completion of step 39 a providing reduced pseudo-frame search areas step 40 provides from the pseudo-frame matching reference block, reduced pseudo-frame search areas in the even field search window and odd field search window. Typically, the reduced pseudo-frame search areas enclose their respective pseudo-frame matching reference block by a two pixel wide boundary. A searching the reduced pseudo-frame search areas step 41 is then effected for identifying the pseudo-frame differences between the current odd field block and the reference blocks in both the first and second search window and identifying the differences between the current even field block and the reference blocks in the first and second search window. Thereafter, a determining step 42 determines, from the pseudo-frame differences in step 41, the following: a suitable first pseudo-frame matching reference block from one reference block pair comprising a reference block in the even field search window for the current even field block and corresponding reference block in the odd field search window for the current odd field block; and a suitable second pseudo-frame matching reference block from another one reference block pair comprising a reference block in the odd field search window for the current even field block, and a corresponding reference block in the even field search window for the current odd field block, where each of reference block pair have corresponding search window locations.

A selecting a pseudo-frame motion vector step 43 then selects a pseudo-frame motion vector from either the first or second pseudo-frame matching reference block. This is done by selecting the pseudo-frame matching reference block having the least differences.

A picking step 44 is effected after both step 38 and 43 are completed. The picking step 44 picks a preferred motion vector from either the pseudo-frame motion vector or the respective field motion vector for both the current odd field block and current even field block. The preferred motion vector is picked by comparing the differences associated with the pseudo-frame motion vector with differences associated with the respective field motion vector for both the current odd field block and current even field block. As will be apparent to a person skilled in the art, SAD provides a count that identifies the differences. Thus, if the count value associated with the pseudo-frame motion vector have a count value of no more than 100 counts greater than the count value of the combined differences associated with the respective field motion vector for both the current odd field block and current even field block, then the preferred motion vector is the pseudo-frame motion vector.

Otherwise, the preferred motion vector is selected from the field motion vector for the current odd field block and current even field block that has the lowest count value.

The method 30 terminates at step 45 and will be repeated for generation of another motion vector for the current image.

Advantageously, the invention provides reduced search areas after determining a possible suitable block match associated with a potential motion vector. Also, the invention also allow for concurrent field and frame (pseudo-frame) motion vector determination.

The detailed description provides preferred exemplary embodiments only, and is not intended to limit the scope, applicability, or configuration of the invention. Rather, the detailed description of the preferred exemplary embodiments provides those skilled in the art with an enabling description for implementing a preferred exemplary embodiment of the invention. It should be understood that various changes may be made in the function and arrangement of elements without departing from the spirit and scope of the invention as set forth in the appended claims.

What we claim is:

1. A method for determining motion vectors in an interlaced video coding system for coding images comprising interlaced odd and even fields, the method comprising the steps of:

(i) selecting a current odd field block and a current even field block that respectively comprise odd and even fields of a selected current image block of a current image;

(ii) identifying differences between the current odd field block and reference blocks in a first search window that is one of either an even field search window of even fields or an odd field search window of odd fields that combined form part of a reference image, and errors between the current even field block and the reference blocks in a second search window that is the other one of the even field search window or odd field search window;

(iii) determining, from the differences in the step of (ii) identifying, a suitable first odd field matching reference block for the current odd field block and a suitable first even field matching reference block for the current even field block;

(iv) providing, from the suitable first odd field matching reference block and suitable first even field matching reference block, respective reduced search areas in the even field search window and odd field search window;

(v) searching the reduced search areas for identifying the differences between the current odd field block and the reference blocks in the second search window and identifying the differences between the current even field block and the reference blocks in the first search window;

(vi) determining, from the differences in the step of (v) searching, a suitable second odd field matching reference block for the current odd field block and a suitable second even field matching reference block for the current even field block; and (vii) selecting a respective field motion vector for both the current odd field block and current even field block, the respective motion vector being based on relative motion between the current odd field block and either the first or second odd field matching reference block and relative motion between the current even field block and either the first or second even field matching reference block.

2. A method for determining motion vectors as claimed in claim 1, the method further including the steps of:

(viii) determining a suitable pseudo-frame matching reference block from combined differences that are differences, identified in step (ii), of each odd field block and even field block that comprise the current image block when compared with respective blocks having corresponding search window locations; and (ix) providing, from the pseudo-frame matching reference block, reduced pseudo-frame search areas in the even field search window and odd field search window.

3. A method for determining motion vectors as claimed in claim 2, wherein after the step (ix) of providing, the method includes further steps of:

(x) Searching the reduced pseudo-frame search areas for identifying the pseudo-frame differences between the current odd field block and the reference blocks in both the first and second search window and identifying the differences between the current even field block and the reference blocks in the first and second search window; and (xi) Determining, from the pseudo-frame differences in the step of (x) searching, a suitable first pseudo-frame matching reference block from reference block pair comprising a reference block in the even field search window for the current even field block and corresponding reference block in the odd field search window for the current odd field block, and a suitable second pseudo-frame matching reference block from another reference block pair comprising a reference block in the odd field search window for the current even field block, and a corresponding reference block in the even field search window for the current odd field block, where each said reference block pair has corresponding search window locations; and (xii) Selecting a pseudo-frame motion vector from either the first or second pseudo-frame matching reference block.

4. A method for determining motion vectors as claimed in claim 3, further including the step of (xiii) picking a preferred motion vector from either the pseudo-frame motion vector or the respective field motion vector for both the current odd field block and current even field block.

5. A method for determining motion vectors as claimed in claim 4, wherein the step of (xiii) picking includes comparing the differences associated with the pseudo-frame motion vector with differences associated with the respective field motion vector for both the current odd field block and current even field block.

6. A method for determining motion vectors as claimed in claim 5, wherein if the differences, in the step of (xiii) picking, associated with the pseudo-frame motion vector have a count value of no more than 100 counts greater than the count value for the combined differences associated with the respective field motion vector for both the current odd field block and current even field block, then the preferred motion vector is the pseudo-frame motion vector.

7. A method for determining motion vectors as claimed in claim 2, the step of (iii) determining and the step of (viii) are effected concurrently.

* * * * *